United States Patent
Bedogni et al.

(10) Patent No.: US 12,474,279 B2
(45) Date of Patent: Nov. 18, 2025

(54) COLLIMATOR

(71) Applicant: ISTITUTO NAZIONALE DI FISICA NUCLEARE, Rome (IT)

(72) Inventors: Roberto Bedogni, Rome (IT); Marco Costa, Turin (IT)

(73) Assignee: ISTITUTO NAZIONALE DI FISICA NUCLEARE, Rome (IT)

( * ) Notice: Subject to any disclaimer, the term of this patent is extended or adjusted under 35 U.S.C. 154(b) by 430 days.

(21) Appl. No.: 17/922,996

(22) PCT Filed: May 6, 2021

(86) PCT No.: PCT/IB2021/053856
§ 371 (c)(1),
(2) Date: Nov. 3, 2022

(87) PCT Pub. No.: WO2021/224857
PCT Pub. Date: Nov. 11, 2021

(65) Prior Publication Data
US 2023/0358692 A1  Nov. 9, 2023

(30) Foreign Application Priority Data
May 6, 2020  (IT) .......................... 102020000010132

(51) Int. Cl.
*G21K 1/02* (2006.01)
*G01N 23/05* (2006.01)
(Continued)

(52) U.S. Cl.
CPC ............. *G01N 23/05* (2013.01); *G01N 23/09* (2013.01); *G01N 23/2073* (2013.01); *G21K 1/025* (2013.01); *G01N 2223/316* (2013.01)

(58) Field of Classification Search
CPC .... G01N 23/05; G01N 23/09; G01N 23/2073; G01N 2223/316; G21K 1/025
See application file for complete search history.

(56) References Cited

U.S. PATENT DOCUMENTS 3,749,911 A     7/1973  Hoover et al.
10,416,318 B1 * 9/2019  Newman ................. G01T 1/204
(Continued)

OTHER PUBLICATIONS

Dinca et al. "Collimated Neutron Beam for Neutron Radiography", Rom. Jour. Phys., vol. 51, Nos. 3-4, Bucharest, 2006, p. 435-441. (Year: 2006).*

(Continued)

*Primary Examiner* — David P Porta
*Assistant Examiner* — Mamadou Faye
(74) *Attorney, Agent, or Firm* — Bayramoglu Law Offices LLC

(57) ABSTRACT

A compact and small size multichannel collimator for neutrons with energies up to 50 keV is provided. The collimator has a multichannel structure composed of collimating channels (in air, vacuum or in the non-interacting atmosphere of Helium-4) alternating with "full" channels made with absorbent materials for slow neutrons. The geometry of the individual collimating and absorbing channels can be arbitrary. The geometry with channels of square section, such as to create a perfect checkerboard, is preferred from the point of view of ease of construction.

19 Claims, 2 Drawing Sheets

(51) Int. Cl.
*G01N 23/09* (2018.01)
*G01N 23/207* (2018.01)

(56) References Cited

U.S. PATENT DOCUMENTS

| | | | |
|---|---|---|---|
| 2010/0163744 A1* | 7/2010 | Lacy | G01T 1/18 250/394 |
| 2019/0108923 A1* | 4/2019 | Anderson | G21F 1/00 |
| 2019/0179050 A1* | 6/2019 | Jegou | G01V 5/222 |
| 2021/0008391 A1* | 1/2021 | Niimi | A61N 5/1067 |

OTHER PUBLICATIONS

Bayanov et al. "Accelerator-based neutron source for the neutron-capture and fast neutron therapy at hospital", Nuclear Instruments and Methods in Physics Research A 413, Elsevier Science B.V. 1998, p. 397-426. (Year: 1998).*

Calvin "Realizing a Compact Neutron Beam Collimator for Neutron Radiaology", A Major Qualifying Project Submitted to the Faculty of Worcester Polytechnic Institute in partial fulfillment of the requirements for the degree of Bachelor of Science, Apr. 4, 2019, p. 1-28. (Year: 2019).*

A. Cimmino, et al., Micro-array collimators for X-rays and Neutrons, SPIE, 1998, pp. 376-384, vol. 3511.

Neutron Image Gallery: a Visual Guide to Neutron Imaging Neutron and X-ray images produced in Phoenix's neutron maging center, retrieved from: https://phoenixwi.com/neutron-radiography/neutron-image-gallery/.

D.A. Allen, et al., Neutron radiography using a transportable superconducting cyclotron, Nuclear Instruments and Methods in Physics Research, 1994, pp. 128-133, vol. A 353.

* cited by examiner

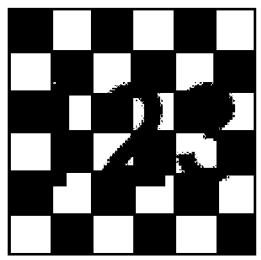 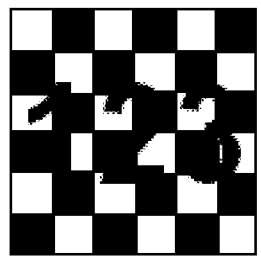 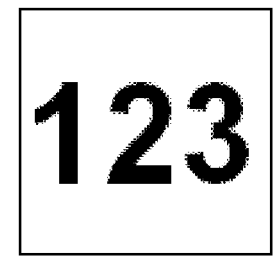
FIG. 3A        FIG. 3B        FIG. 3C
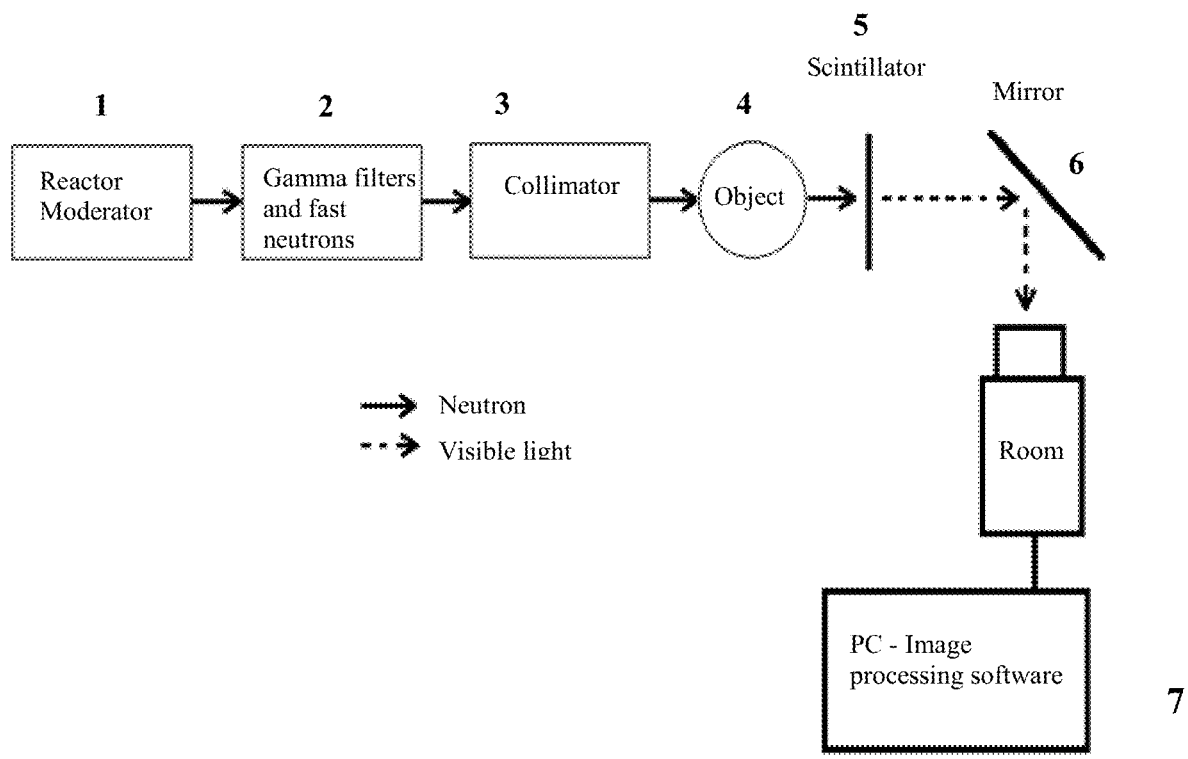
FIG. 4

COLLIMATOR

CROSS REFERENCES TO THE RELATED APPLICATIONS

This application is a national phase of International Patent Application No. PCT/IB2021/053856 filed on May 6, 2021, which claims priority based on Italian patent application 102020000010132 filed on May 6, 2020. The disclosures of the applications are hereby incorporated by reference in their entireties.

TECHNICAL FIELD

The present invention refers to a collimator for slow neutrons, in particular a multichannel collimator for neutrons with energy up to 50 keV which is compact and small in size.

BACKGROUND

Neutrons are heavy particles (mass at rest 939.56 MeV/c$^2$) but without charge. They interact predominantly through strong but short-range ($10^{-15}$ nuclear interactions m). Since the typical distances between nuclei in matter are of the order of $10^{-10}$ m, they can cross large distances in the raw material to interact with it. This makes neutrons a very penetrating probe able to reveal properties that other agents or particles (charged particles, photons, ultrasounds . . . ) cannot probe. The information provided by neutron investigations is considered complementary to that provided by X-rays, because the former interact with nuclei, while the latter with the electronic structure of matter. Being endowed with magnetic moment, neutrons can also interact with atomic magnetic moments and spins.

Since the probability of neutron interaction with matter (quantified by the physical concept of cross section) typically decreases with increasing neutron energy, neutron investigations with slow neutrons (energy <1 eV) are the most common.

At present, slow neutron studies are performed in large-scale plants such as the Budapest Research Reactor, the Institut Laue-Langevin (ILL) and the reactor of the Technische Universität München, Garching.

As regards the power accelerators, reference is made to the spallation sources of ISIS STFC Rutherford Appleton Laboratory (UK), the Spallation Neutron source (Oak Ridge) and, in the near future, the European Spallation Source ESS (Lund). Typically there are two classes of neutron investigations carried out with slow neutrons: imaging and scattering.

In the first class (imaging) 2D (neutron radiography) or 3D (neutron tomography) images of the internal structure of an object are obtained, exploiting the different "transparency" of different materials at the same neutron radiation. A prominent example is the ability of this type of imaging to detect moisture or hydrogenated materials, even when shielded by large amounts of non-hydrogenated material (e.g. iron). This is based on the fact that the cross section (probability of interaction) of slow neutrons is much higher for hydrogen than for certain metals.

Imagine a collimated neutron beam (ie with the neutron trajectories that are parallel to each other) and uniform over an area equal to at least the area of the object to be investigated. Depending on the spatial distribution of the neutron-sensitive materials within the object, different areas of the object will absorb or deflect the incident beam differently. Due to these phenomena, the neutron beam downstream of the object will no longer be collimated but will have lower intensities where the absorption and deviations suffered were greater. The spatial map of these attenuations also provides quantitative information on the internal structure of the object. This map is recorded thanks to imaging systems, generally formed by a neutron-sensitive luminescent screen observed by a camera.

Having a well-collimated neutron beam is a necessary and fundamental condition for obtaining good quality images and simplifying "post processing".

The techniques of "neutron scattering" allow to probe the structure of materials (positions of the atoms) and the dynamics (motion of the atoms). Unlike neutron imaging, which studies what remains of the collimated beam after interacting with the object, scattering techniques study the distribution of neutrons deflected (or, even if improperly, "scattered") from the object. This is accomplished by placing several neutron detectors (such as Helium-3 counters) in a circumferential arrangement around the sample. Each detector will correspond to a certain scattering angle. In these techniques, in addition to collimating the primary neutron beam, the individual sensors are often collimated at various angles, in order to prevent events due to multiple scattering or to the bottom of the equipment.

Relevant examples of such techniques are: neutron diffraction, small angle neutron scattering (SANS), reflectometry, quasi-elastic neutron scattering (QENS) and Inelastic neutron scattering spectroscopy (INS).

The existing neutron collimators (typically the collimator illustrated in FIG. 1) have a cylindrical symmetry and are based on evolutions or improvements of a simple basic concept, that according to which the collimator consists of a tube whose walls are made of a material containing slow neutron absorbers, for example $^{10}$Boron, $^6$Li or Cadmium. Any distribution of directions at the entrance of the collimator is reduced to an "almost parallel" distribution where the maximum angular deviation with respect to the "desired" direction (indicated with 1 in FIG. 1) is given by an angle whose tangent is D/L, where D is the diameter of the pipe and L its length. Thinking of neutron radiography as an example, it is clear that the quality of the radiographic image will improve as the collimation ratio L/D increases (which in practice constitutes the precision of the collimator to select the neutrons that pass through it with a direction parallel to its longitudinal axis).

In modern radiography or neutron tomography equipment, L/D ratios between 100 and 1000 are generally reached. In the case of L/D=500 for example, a field of view (FOV=field of view) with a diameter of 5 cm, which we can assimilate to the diameter D, it will require a collimator length of 25 meters.

There are three main implications of these large collimation distances:

(1) the equipment must have large spaces,
(2) since the intensity of the beam decreases with the inverse square of the distance, a very intense primary beam will be needed (at collimator input) in order to have a sufficiently intense useful beam (at the collimator output). Imaging beams require the intensity of the beam reaching the sample to be at least $10^6$ cm$^{-2}$ s$^{-1}$; therefore if a collimation distance of 25 meters is used, the beam at the collimator entrance must have a fluence intensity of $10^9$-$10^{10}$ cm$^{-2}$ s$^{-1}$. Clearly, only large plants such as nuclear reactors or high-power accelerators can guarantee these intensities, (3) the collimator must be kept under vacuum or filled with a low scattering cross section gas (such as $^4$He). The air, in fact, due to the high nitrogen content, attenuates slow neutrons by 5% for every meter of length.

There are also other design elements of the collimator which, while playing a role in the quality of the neutron beam, do not modify the geometric concepts described above. Some of them are used to reduce fast neutrons and gamma rays, always present in nuclear reactors and power accelerators. These components can alter image quality or damage imaging devices. To reduce these alterations, the following are inserted in the collimator:

filters to attenuate gamma rays, typically in Bismuth (it reduces gamma rays similarly to lead but has a lower neutron absorption cross section)

Alumina filters, to eliminate fast neutrons diverting them out of the useful beam.

Among the collimators known to date, the one described in CIMMINO A. et al.: "MICRO-ARRAY COLLIMATORS FOR X-RAYS AND NEUTRONS", PROCEEDINGS OF SPIE, IEEE, US, vol. 3511, 1 Jan. 1998 (1998-01-01), pages 376-384, XP000878513, DOI: 10.1117/12.324325 ISBN: 978-1-62841-730-2 is very small, as it is characterized by lengths in the order of millimeters. The collimator described here is obtained by laminating metal sheets and can be made only by mechanically working ductile metals, selected from those transparent and non-transparent to neutrons. The most transparent and easily workable material is aluminum which however absorbs neutrons by 10% for every centimeter of length (in fact the Cimmino collimator is only 3-4 mm long). Otherwise, air (like vacuum) is highly transparent, in fact one centimeter of air reduces the neutron flux by only 0.05%. To reach a collimation ratio greater than 100, the collimator described by Cimmino has millimeter lengths and is characterized by micrometric channel dimensions with an evident asymmetry between the thickness of the "transparent" aluminum channels to neutrons and those of absorbing cadmium.

The collimation ratio of the Cimmino artefact therefore falls within the desired range but the asymmetry of the values between the size of the "transparent" aluminum channels and the size of the absorbent partitions makes it very difficult if not impossible to guarantee the uniformity of illumination of the object to be analyzed and at the same time very likely the introduction of negative systematic effects on image quality. Furthermore, in the case of stratified laminations such as those proposed by Cimmino, the impossibility of using air as a material to create the channels "transparent" to neutrons limits the maximum collimation length to 1 or 2 cm so that even with micrometric channels objects larger than 1 cm$^2$ cannot be analyzed.

The application of the neutrographic radiography technique to artefacts (industrial, cultural heritage) [https://phoenixwi.com/neutron-radiography/neutron-image-gallery/] of typically variable dimensions from cm$^2$ to thousands of cm$^2$ requires collimators that have a FOV (Field Of View) of the same order of magnitude as the artifact to be examined.

Since the solution proposed by Cimmino cannot use air as a "transparent" material, his method is ill-suited to the common applications indicated above.

Furthermore, although Cimmino indicates the possibility of making a checkerboard collimator, there are no indications about its realization, which is impractical even with current technologies, remaining confined to a scientific curiosity.

U.S. Pat. No. 3,749,911 describes a collimator obtained by making collimating holes on absorbent plates in random positions, and operating a movement. However, the random nature of the collimating apertures leads to require enormous acquisition times in order to uniformly illuminate the object, a uniformity of illumination that the collimator described in U.S. Pat. No. 3,749,911 achieves only with times tending to infinity.

It is worth remembering here that, in order to obtain a faithful radiographic image, all points on the projection of the object to be examined must be illuminated by the neutron beam for the same period of time.

Therefore, to date there are no collimators available that have at the same time speed of execution of the measurements, compact dimensions and high precision.

Faced with the above problems, there is a strong need to have neutron collimators available that are compact and of reduced lengths, but in any case of such performance that the image is formed correctly and without artifacts.

A collimator which solves the problems identified above and satisfies the needs listed is the object of the present invention, of which a summary is given below.

If not specifically excluded in the detailed description of the invention which follows, what is described in this chapter is to be considered as an integral part of the detailed description.

SUMMARY

The technical problem solved by the invention is that of having perfected an improved device that allows to examine objects of dimensions up to 40 cm×40 cm or more, using a short scanning time and greatly limiting the artifacts in the image production.

Therefore, the object of the present invention is a compact and small-sized multichannel collimator for neutrons with energies up to 50 keV.

The collimator has a "multichannel" type structure composed of collimating channels (in air, vacuum or in the non-interacting atmosphere of $^4$Helium) alternating with "full" channels, ie made with absorbent materials for slow neutrons. This neutron collimator is compact, of reduced length, equipped with a field of view adaptable to the desired application, with high collimation power. The geometry of individual collimating ("empty") and absorbing ("full") canals can be arbitrary.

The geometry with channels having a square section, such as to create a perfect checkerboard, is preferred from the point of view of ease of construction and is described below, by way of demonstration and non-limiting example of the applicability of the collimator according to the invention.

The collimator is a compact multi-channel collimator according to the attached claims.

Another object of the invention are the devices which use the collimator of the invention. In particular, said devices are equipment for analysis by means of imaging and scattering.

Still another object is the image acquisition and processing methodology which uses the collimator of the invention.

Further objects, objects and advantages will become apparent from the detailed description of the invention.

BRIEF DESCRIPTION OF THE DRAWINGS

The present invention is illustrated by means of an example of its embodiment with reference to the figures attached hereto, provided purely for explanatory and non-limiting purposes, in which:

FIGS. 2A-2B schematically illustrate an embodiment of the square section multichannel compact collimator in which collimating channels alternate with absorbing channels with square section; wherein FIG. 2A shows an enlarged view of the circled detail of FIG. 2B; FIG. 2B shows a schematic perspective view of the collimator A;

FIGS. 3A-3C illustrate an example of how collimator A works; wherein FIG. 3A shows a first pass of the collimator; FIG. 3B shows a second pass of the collimator; FIG. 3C shows a final image;

FIG. 4 shows the typical block diagram of a system for investigations with slow neutron beams, in this case the neutron radiography. Such a system for investigations can advantageously use the collimator according to the invention.

DETAILED DESCRIPTION OF THE EMBODIMENTS

Figure 1:
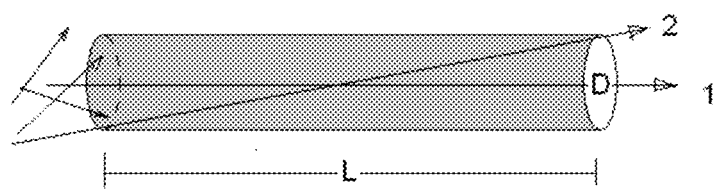
FIG. 1 schematically illustrates the geometry of a neutron collimator according to the state of art.

In the present description the wording "about" refers to values which are within ranges of +/−30% of the indicated value.

With particular reference to the attached figures, the present invention refers to a neutron collimator which, thanks to its construction, can be defined as a compact multichannel collimator. The collimator is particularly suitable for use in the field of neutrons with energy up to 50 keV.

The collimator of the invention as illustrated in FIGS. 2A-2B and 3A-3C has the purpose of overcoming two important constraints which, at present, limit neutron studies only to large-scale plants that have very intense neutron sources (reactors and high power accelerators) and large spaces to house long collimating structures.

With the compact multichannel collimator of the invention there will be as an advantageous direct consequence the reduction of the collimating distances and it will no longer be necessary to maintain the collimation lines under vacuum or in a gas atmosphere not interacting with neutrons.

Furthermore, the collimator allows to have a field of view that can be adapted to the desired applications (as will be better specified below) combined with a high collimation power, despite its small size.

The collimator object of this invention allows to carry out non-destructive neutron studies in much smaller plants and with less intense neutron sources than those of the prior art.

This will produce a breakthrough at the level of research but, above all, at the level of controls of industrial products. It is hardly necessary to remember that non-destructive neutron investigations are fundamental in numerous application fields such as, for example, and not limited to, in the fields of biomedical, pharmaceutical, orthopedic prostheses, electric batteries and energy storage systems, automotive/automotive, electronic, military and aerospace, archeology and cultural heritage and for the verification of possible counterfeits.

While at present the national industries that carry out neutron investigations have to rely on agencies that collect the samples and analyze them abroad, thanks to the device of the invention it will be possible to set up neutron investigation centers at a local level, based on deuterium-deuterium generators or deuterium-tritium now standardized and produced by various companies.

The collimator of the invention can also be called multichannel collimator as it consists of a multiplicity of linear channels of two types:

Collimating channels are hollow channels that allow the passage of neutrons without them being deflected or absorbed, these channels are vacuum-packed or filled with air or gas that does not interact with neutrons;

Absorbent channels, i.e. made of absorbent material for neutrons. The absorbent materials are materials with a high neutron capture cross section such as $^{10}$Boron, $^{6}$Li, Cadmium, Gadolinium, as better defined below.

In other words, the collimator of the invention consists of a multiplicity of parallel channels for the passage of neutrons (also called collimating channels), alternating with absorbing channels, i.e. made with absorbent material containing elements with a high neutron capture cross section such as $^{10}$Boron, $^{6}$Li, Cadmium, Gadolinium, as better defined below.

The cross-section of the collimating channels and absorbing channels can be any, as long as it is much smaller than the size of the object to be analyzed.

Seen in section, the compact collimator of the invention has a multiplicity of collimating channels of side d and section $d^2$ for the passage of neutrons, each of which is surrounded by absorbing channels having an identical section, except the channels of the edge of the checkerboard which are surrounded by a mechanical containment structure.

Figures 2A, 2B:
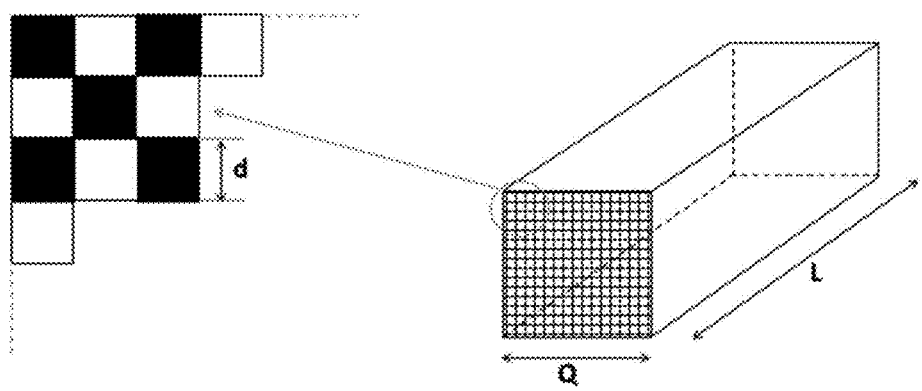

The following shows a preferred version of the multichannel collimator, made with collimating channels with a square section of air, alternating with identical absorbing channels, filled with or made of absorbent material. As shown in FIGS. 2A-2B, this collimator section is a "perfect checkerboard".

The collimator according to the invention has the shape of a regular solid such as a cylinder or a parallelepiped with a square or rectangular base.

The constructive scheme of the collimator according to the preferred embodiment of the invention is illustrated in FIGS. 2A and 2B and indicated in the following text as "collimator A".

FIG. 2B shows that the collimator A has the form of a rectangular parallelepiped with base, or section, a square of side Q and length L. The direction of collimation is identified at the longitudinal axis of the collimator which corresponds to the height or length of the parallelepiped. The front and rear end faces of the parallelepiped are identical, so that neutrons can enter indifferently from one or the other face.

The parallelepipedal shape consists of a multiplicity of parallelepiped units with a square base of side d and length L which constitute the collimating channels (in the figure shown in white) and the absorbing channels (in the figure shown in black) assembled parallel to each other according to an arrangement checkerboard, as shown in FIG. 2A. The number and dimensions of the parallelepiped units are not binding as the total dimensions of the collimator A are not binding. The parallelepipedal geometric shape of the collimator is not binding as the geometry of the individual channels is not binding which, in addition to the square section shown here, they can have a rectangular or circular section. Channel distribution is an orderly regular distribution.

Keep in mind that the collimating power of a collimator is quantified by the L/d ratio and that therefore, the higher the L/d value, the more parallel the trajectories of the neutrons exiting the collimator will be. As mentioned above, optimal values of the collimation ratio are in the range from about 100 to about 1000, while the values of d are in the range from about 0.5 mm to about 10 mm Again with particular reference to the preferred embodiment illustrated in FIGS. 2A and 2B, the collimator A is therefore composed of a multiplicity of channels with a square section of side d, alternating with identical channels in absorbent materials, to form a perfect checkerboard (FIGS. 2A and 2B). The number of channels, or the extension of the checkboard, must be such as to completely cover the section of the object to be examined.

In this checkerboard structure each black square indicates a full channel made of absorbent material for neutrons ($^{10}$Boron, $^6$Lithium, Cadmium, Gadolinium). The channel of absorbent material can also be constituted by an alloy, a compound, a polymer or a mixture containing or made with the above radionuclides $^{10}$Boron, $^6$Lithium, Cadmium, Gadolinium. An example of a suitable polymer is borate polyethylene, a blend of polyethylene and boron carbide produced by several companies and well known in the nuclear industry. Said borated polyethylene can be melted into bars with a square section of side d and length L to form the "full channels". The percentage of said radionuclides must be such that the absorbing channel, along its length L, offers an attenuation factor for slow neutrons of at least $10^4$. An expert in nuclear physics or engineering can easily calculate the attenuation factor for possible absorbent materials as the length of the channel varies.

In this checkerboard structure each white square indicates an air or vacuum duct. Each single air channel constitutes the so-called "elementary collimating cell", since it is in fact a square section cavity with side d much shorter than length L, which allows the passage of neutrons. Since this air cavity is completely surrounded by absorbent material, it exerts a direction selection action towards the incoming neutrons, thus constituting a miniaturized collimator. In turn, the parameters of length L and side d of the section of the collimating unit cell will be linked together so as to return to optimal collimation ratio, ranging from about 100 to about 1000.

Therefore the expected the value of d can be small a pleasure, while the value of L can be as large as desired in order to obtain the desired value for the collimation parameter which in this case is the L/d ratio.

If the L/d ratio is too high to accurately produce whole bars, perfectly straight, of length L and side d, it is possible to join several bars of length less than L to form a single absorbing channel of the desired overall length. The dimension d can be of the order of mm or tenths of a mm, preferably from about 0.5 mm to about 10 mm and the smaller the value of d, the shorter the length L of the collimator can be.

Furthermore, if we consider that the neutron intensity decreases with the square of the distance from the source, in the case of the collimator of the invention the very small distances will bring as an advantage the possibility of using sources of reduced intensity, obtainable with the laboratory accelerators currently available on the market and thus greatly expanding the number of laboratories that will have access to neutron imaging and neutron scattering applications.

Therefore the collimator can be constructed of the desired dimensions as a function of the L/d ratio which is in fact the factor that directly affects the detail capacity of the neutron investigation.

From the point of view of operation, the collimator will generally be characterized by an external dimension Q, which in the case of FIG. 2B is the side of the square section. For the given constructs explained above, the visual field is divided into a checkerboard structure of small squares of side d. In this checkerboard structure the "collimating" channels are alternated with "absorbing" channels.

The collimator will be chosen in such a way as to cover the entire section of the object to be analyzed, ie Q must be greater than the corresponding dimension of the object to be irradiated with the collimated neutron beam leaving said collimator. Corresponding dimension means the dimension of the object along the same axis in reference to which the dimension Q was measured.

A single collimating channel, having for example side d=2.5 mm and length L=2.5 meters, has a high collimating power L/d=1000, but the corresponding field of view (FOV) is limited to only 2, 5 mm on each side. This field of view is too limited and has no practical application. The objects that the industry requires to analyze, as can be seen in [https://phoenixwi.com/neutron-radiography/neutron-image-gallery/], a have characteristic dimensions of many cm per side and therefore require that the collimation system covers an FOV of equivalent size. The idea behind the invention is to combine a multiplicity of elementary cells arranging them in a checkerboard pattern, and such as to cover the desired field of view (even thousands of square centimeters). This arrangement can be used in practice as a collimator having a collimation ratio of 1000, a field of view as large as desired, and a length of only 2.5 meters, provided that the collimator is used as follows:

acquire a multiplicity of images (a minimum number equal to two) in correspondence with different positions (a minimum number equal to two) of the collimator. These different positions are obtained by translating the object, perpendicular to its axis. The same result can be obtained by keeping the object to be analyzed still and moving the collimator. The translation can be discrete or continuous.

In the case of a discrete translation, the minimum acquisition must be of two images acquired in two positions and the displacement must be equal to d.

However, from a practical point of view, the image could be affected by:

small differences in the sections of the air ducts or absorbent material (which should be identical)

parallelism errors between the different ducts alignment errors

Therefore, in addition to at least two positions to be acquired, obtained with a translation equal to "d", it is advantageous to acquire other positions close to the two mentioned, but slightly out of phase in the two dimensions of the space. This will allow to eliminate any artifacts due to the aforementioned causes.

The acquisitions made in each position are managed through known software, since image processing is part of the state of the art knowledge and since the methodology of the analysis of radiographic images is a known technique.

An example of operating mode of the collimator of the invention, in the idealized case of two positions and two images, is illustrated in FIGS. 3A-3C.

For this example we consider the application of neutron radiography.

As shown in the example of FIGS. 3A-3C, two positions are ideally already sufficient to image the entire field of view. Assume that:

the writing "123" (FIG. 3C) is composed of an absorbent material for slow neutrons you want to perform the neutron radiography of this writing the neutron intensity is discretized at two levels: black=absence of neutrons, white=presence of neutrons.

an idealized two-dimensional neutron detector (i.e. with infinite ability to resolve spatial details) is placed behind the writing, so that the neutron beam affects the writing, and only the neutrons that survive it reach the detector behind it.

If a perfectly collimated (ie parallel) neutron beam were available, it would be sufficient to interpose the writing between the neutron beam and the radiographic screen to obtain exactly the image of FIG. 3C. Therefore, a collimator would not be needed.

In reality the beam is not collimated, and the compact multichannel collimator object of this invention will be used to collimate it according to the sequence of operations indicated below by way of non-limiting example.

The checkerboard image of FIG. 3A is the one recorded on the two-dimensional neutron detector by sending the neutron beam (not shown) onto the collimator (not shown), in an arbitrary initial position. The object is placed in correspondence with the collimator and the detector is placed behind the object. The checkerboard effect is naturally due to the alternation of "absorbent" cells and "air" cells.

The image of FIG. 3B is obtained as above, but the collimator has been translated by a distance "d" with respect to the initial position. The image obtained by joining the two sub-images will constitute the final result, FIG. 3C.

If the field of view has dimension Q much greater than d, the present invention will have permission to make a complete radiography employing a collimator of length L. The quality of the radiographic image, however, will not be that which would be obtained with a traditional collimator with a collimation ratio L/Q, but will in fact correspond to a collimation ratio L/d.

However, being L/d>>L/Q, a considerable improvement will have been obtained with respect to the state of the art.

In terms of examples, let it be:

Q=20 cm d=2.5 mm

L=2.5 m

The final image (FIG. 3C) will have a quality corresponding to L/d=1000, therefore very high. However, the collimator will be only 2.5 meters long. If a traditional collimator had been used, the length needed to have L/Q=1000 would have been 200 meters.

The advantages in terms of smaller spaces and lower intensity required are evident. Furthermore, it is not necessary to keep the structure under vacuum or in a non-interacting atmosphere.

In a real situation, it is possible that the procedure described above presents some artifacts, albeit minimal and negligible, in the union image, due to multiple reasons such as:

small differences in the sections of the air or absorbent material tubes (which should be identical)

errors of parallelism between the different tubes errors of alignment partial reflection of the neutrons on the walls of the absorbing cells.

Taking a more articulated trajectory will contribute, compared to the two idealized positions of the example, to eliminate these artifacts. Furthermore, an expert in the field of image reconstruction and processing can easily develop algorithms to improve the final image.

The translation of the collimator on the sample can in fact be carried out in the three dimensions of the space and, as mentioned above, it can be discrete or continuous, the only constraint is that, in order to obtain a faithful radiographic image, all the points on the projection of the object to be examined are illuminated by the neutron beam for the same period of time so as to eliminate or minimize the image artifacts, artifacts that are present in the collimators of the known art, as shown for example by Cimmino (quoted Ref).

The extreme importance of the combination of perfect checkboard and trajectory such that each point of the projection of the object is covered for the same time by absorbent partitions and air channels allows that in the final radiographic image there will be no trace of artifacts due to the presence of absorbing partitions.

Although in the real situation this perfect checkerboard structure and square channels, as well as channel structures of different geometry, may require more than two positions, it remains advantageous as the scanning will certainly take less time than in the other cases, such as for example those of the devices of the prior art in which the through channels are made at random in the absorbent material.

The invention described here can be theoretically extended, by varying the values of d, Q and L, to cover any need in the context of neutron investigations with energy lower than 50 keV. Furthermore, as previously mentioned, a single collimating structure can be obtained as a multiplicity of shorter structures placed in cascade.

FIG. 4 shows the typical block diagram of a system for investigations with slow neutrons beams, in this case the neutron radiography. Such a system can employ the collimator according to the invention. The meaning of the blocks is given below:

1. "Reactor/moderator" means the neutron source, typically a nuclear reactor. Since neutrons are produced at "fast" energies (of the order of MeV), moderating material (such as water, graphite) is needed to slow them down to "slow" energy useful for neutron investigations. The moderator is normally present as necessary for the chain reaction. The fission reaction in Uranium-235 and Plutonium-239 is in fact more probable for slow neutrons.
2. "Gamma filters and fast neutrons": a fraction of the slow neutrons produced in the reactor is collected by a structure that leads them to the neutron line of investigation. Normally this structure has as its first component a series of "filter" materials to reduce unwanted radiation: Bismuth filters can be used for gamma rays and monocrystalline filters can be used for fast neutrons $Al_2O_2$ or $SiO_2$
3. The neutron collimator
4. The object to be analyzed
5. A sparkling screen capable of converting the beam of slow neutrons emerging from the object (with the relative spatial modulations that contain the information on the sample) into visible light. This product is commercially available in many variations. An example is a mixture of $^6LiF:ZnS(Ag)$ in varying proportions and thickness less than 1 mm
6. A mirror to deflect visible light out of the neutron beam area, where it is collected by a camera. Said camera would be damaged if exposed to residual neutrons present on beamline
7. The image processing software can be any commercial software used for example in the context of conventional radiology.

As mentioned above, the compact multichannel collimator for slow neutrons of the invention involves, compared to the state of the art, three fundamental advantages for neutron techniques: (1) It requires much shorter collimation distances, making neutron science applications possible also in medium-sized laboratories (2) It requires much less intense neutron sources, extending the variety of installations suitable for neutron science from large power reactors and accelerators to small facilities such as small power accelerators and deuterium-deuterium or deuterium-tritium generators. (3) By making collimation possible within a few meters of distance, it eliminates the need to keep collimating structures under vacuum or under non-interacting gas (such as Helium-4).

The collimator object of the invention allows to carry out non-destructive neutron studies in much smaller systems and with less intense neutron sources. This constitutes a turning point at the research level but, above all, at an industrial level. It is hardly necessary to remember that non-destructive neutron investigations are fundamental in the fields of biomedical, pharmaceutical, orthopedic prostheses, electric batteries and energy storage systems, automotive/automotive, electronic, military and aerospace. While at present the national industries that carry out neutron investigations have to rely on agencies that collect the samples and analyze them abroad, thanks to this invention it is possible to set up neutron investigation centers at a local level, based on deuterium-deuterium or deuterium generators. tritium of medium intensity ($10^{10}$-$10^{13}$ neutrons per second on the entire solid angle) now standardized and produced by various companies.

The collimator of the invention can be used in neutron investigations carried out with neutrons up to 50 keV. Particularly advantageous is its use in imaging; in particular imaging performed with neutrons with energy up to 1 eV.

The collimator of the invention is very efficient with respect to the collimators of the prior art (Cimmino et al) as it uses air or vacuum and non-transparent metals, with which it would be unthinkable to transmit neutrons over lengths greater than one cm. On the other hand, the collimator of the invention is scalable and can reach any L/d ratio in the range 100-1000, therefore it will be extremely precise while maintaining contained lengths.

The ordered structure of the collimator of the invention, coupled with a predetermined and possible movement in all directions, allows to reach the condition of uniform illumination of the sample to be examined with very low scanning and analysis times. The high symmetry also allows for an almost perfect reconstruction of the image to be examined.

Furthermore, it is emphasized that the collimator of the invention can offer fields of view of tens of cm times tens of cm, allowing to perform radiographs on macroscopic objects in an optimal time, given the optimal combination of checkboard and trajectory. The present invention allows the construction of transportable neutron imaging systems where there is an object to be examined that cannot otherwise be moved from its seat, for example large industrial carpentry items such as bridges, ships, beams etc. or cultural goods such as statues or fragile and non-transportable objects.

Compared to the state of the art (relating to the subset of compact collimators for neutrons), the object of the invention presented here guarantees, for the same source, much shorter exposure times, by at least a factor of 10.

What is claimed is:

1. A collimator for neutrons, wherein
    the collimator has a shape of a regular solid with a square section of a side Q and comprises a front end face and a posterior end face, wherein the front end face and the posterior end face are parallel and spaced apart by a length L, and a direction of collimation corresponds to a longitudinal axis of the collimator,
    the collimator comprises a plurality of identical units in the form of channels with a longitudinal axis parallel to the longitudinal axis of the collimator, wherein absorbing channels made of absorbent material for neutrons and collimating channels alternate with each other, and the absorbing channels and the collimating channels each have a square section of a side d and are organized according to a regular checkerboard arrangement, the absorbing channels surround the collimating channels, and the absorbing channels are identical to the collimating channels.

2. The collimator according to claim 1, wherein the plurality of identical units in the form of square section channels of the side d<<Q are assembled together according to the regular checkerboard arrangement, wherein the collimating channels and the absorbing channels alternate and d varies in an interval from about 0.5 mm to about 10 mm.

3. The collimator according to claim 1, wherein the front end face and the posterior end face are identical to each other and an entry of the neutrons occurs indifferently from the front end face or the posterior end face of the collimator.

4. The collimator according to claim 1, wherein the absorbent material is a material selected from: an alloy, a compound, a polymer or a mixture containing or made with radionuclides selected from: $^{10}$Boron, $^{6}$Lithium, Cadmium, Gadolinium, wherein a percentage of the radionuclides is determined by allowing the absorbing channels, along the length L, to have an attenuation factor for neutrons of at least $10^6$.

5. The collimator according to claim 1, wherein each collimating channel is a cavity filled with air or vacuum or filled with a gas, wherein the gas does not interact with the neutrons.

6. The collimator according to claim 1, wherein the neutrons have an energy of up to 50 keV.

7. The collimator according to claim 1, wherein the neutrons have an energy of up to 1 eV.

8. A process for analyzing a sample with a device comprising the collimator according to claim 1, comprising the following basic steps:
    acquiring at least two images at different relative positions between the collimator and the sample, wherein the at least two images are obtained by translating the collimator, perpendicular to an axis of the collimator, or by keeping the collimator-stationary and translating the sample to be analyzed;
    composing the different positions to form a trajectory, wherein each point of a surface of the sample has been acquired for the same time by the collimating channels and the absorbing channels.

9. The process according to claim 8, wherein the analysis of the sample is performed with a neutron imaging technique comprising radiography or tomography.

10. The process according to claim 8, wherein a neutron beam intended to affect the sample is collimated for studies based on a neutron deviation by the sample itself, the studies comprises neutron diffraction and neutron spectroscopy studies.

11. A device for investigations with neutron beams, comprising the collimator according to claim 1.

12. The device according to claim 11, further comprising:
    a neutron source;
    at least one filter;

an object to be analyzed;

a sparkling screen configured for converting the neutron beams emerging from the object into visible light;

a mirror to deflect the visible light out of an area of the neutron beams and a camera;

a computer for processing images.

13. A method using the collimator according to claim 1 for non-destructive neutron investigations, wherein the method is applied in the fields of biomedical, pharmaceutical, orthopedic prostheses, electric batteries and energy storage systems, automotive, electronic, military and aerospace, in the field of archeology and cultural heritage and for a detection of counterfeiting.

14. The collimator according to claim 2, wherein the front end face and the posterior end face are identical to each other and an entry of the neutrons occurs indifferently from the front end face or the posterior end face of the collimator.

15. The collimator according to claim 2, wherein the absorbent material is a material selected from: an alloy, a compound, a polymer or a mixture containing or made with radionuclides selected from: $^{10}$Boron, $^{6}$Lithium, Cadmium, Gadolinium, wherein a percentage of the radionuclides is determined by allowing the absorbing channels, along the length L, to have an attenuation factor for neutrons of at least $10^6$.

16. The collimator according to claim 3, wherein the absorbent material is a material selected from: an alloy, a compound, a polymer or a mixture containing or made with radionuclides selected from: $^{10}$Boron, $^{6}$Lithium, Cadmium, Gadolinium, wherein a percentage of the radionuclides is determined by allowing the absorbing channels, along the length L, to have an attenuation factor for neutrons of at least $10^6$.

17. The collimator according to claim 2, wherein each collimating channel is a cavity filled with air or vacuum or filled with a gas, wherein the gas does not interact with the neutrons.

18. The collimator according to claim 3, wherein each collimating channel is a cavity filled with air or vacuum or filled with a gas, wherein the gas does not interact with the neutrons.

19. The collimator according to claim 4, wherein each collimating channel is a cavity filled with air or vacuum or filled with a gas, wherein the gas does not interact with the neutrons.

* * * * *